(12) United States Patent
Matsumoto et al.

(10) Patent No.: US 7,266,698 B2
(45) Date of Patent: Sep. 4, 2007

(54) TIME STAMPING SYSTEM FOR ELECTRONIC DOCUMENTS AND PROGRAM MEDIUM FOR THE SAME

(75) Inventors: Tsutomu Matsumoto, Yokohama (JP);
Tadahiro Sato, Yokohama (JP);
Keisuke Ichikawa, Yokohama (JP)

(73) Assignee: Amano Corporation, Kanagawa-Ken (JP)

( * ) Notice: Subject to any disclaimer, the term of this patent is extended or adjusted under 35 U.S.C. 154(b) by 777 days.

(21) Appl. No.: 10/339,466

(22) Filed: Jan. 10, 2003

(65) Prior Publication Data
US 2003/0159048 A1 Aug. 21, 2003

(30) Foreign Application Priority Data
Feb. 20, 2002 (JP) .............................. 2002-042487

(51) Int. Cl.
*H04L 9/32* (2006.01)
(52) U.S. Cl. .................. 713/178; 713/168; 713/176; 705/67; 705/75
(58) Field of Classification Search ................ 713/168, 713/176–179; 705/3, 67, 75
See application file for complete search history.

(56) References Cited

U.S. PATENT DOCUMENTS 5,422,953 A * 6/1995 Fischer ...................... 713/172
6,587,945 B1 * 7/2003 Pasieka ....................... 713/176
6,816,969 B2 * 11/2004 Miyazaki et al. ........... 713/180

FOREIGN PATENT DOCUMENTS

WO WO9203000 * 2/1992

OTHER PUBLICATIONS

Schneier, Applied Cryptography, Second edition, John Wiley and Sons, Inc. p. 17.*
Schneier, Applied Cryptography, 1996, Second Edition, John Wiley and Sons, Inc., p. 17 (This is the supplemental non-patent documents submitted with the office action dated May 26, 2006).*

* cited by examiner

*Primary Examiner*—Emmanuel L. Moise
*Assistant Examiner*—Minh Dieu Nguyen
(74) *Attorney, Agent, or Firm*—Stevens, Davis, Miller & Mosher, LLP (57) ABSTRACT

A time stamping system for electronic documents has a document preparation device and a time stamp issuing server. The document preparation device includes an electronic document reading device that reads an electronic document. A digest value computer computes a digest value based on the read document. A transmitter transmits the computed digest value to the time stamp server with a request for a time stamp. A receiver receives the requested time stamp from the time stamp server and an electronic writer writes the received time stamp into the electronic document.

7 Claims, 10 Drawing Sheets

TIME STAMPING SYSTEM FOR ELECTRONIC DOCUMENTS AND PROGRAM MEDIUM FOR THE SAME

BACKGROUND OF THE INVENTION

1. Field of the Invention

The present invention relates to a time stamping system for electronic documents capable of stamping a certified time and date on each of the electronic documents to certify a preparation time and data of the document as well as to a computer-readable program medium used in the system.

2. Prior Art

Certified time information is required in communication systems for business contract such as those for electronic commerce, electronic authentication, and electronic application. The conventional types of communication systems for business contract have been built on precise time keeping machines such as the GPS or electronic wave clocks, but it has been impossible to certify that the system is operated according to truly correct time information.

The technology for certifying time information is disclosed in Japanese Patent Publication No. HEI 6-501571 (PCT/US91/05386•WO92/03000) entitled "METHOD OF ACCURATELY TIME-STAMPING ON NUMERIC DOCUMENTS". In this system, when a document prepared by an author is transmitted to an external organization, the external organization prepares a receipt indicating the time of receipt thereof and containing at least a portion of the document and returns the prepared receipt to the author, so that author can store and use the receipt for objectively certifying the preparation data, if necessary.

(Problems to be Solved by the Invention)

With the conventional types of systems as described above, the author stores the receipt at the author's hand, so that the author can show the receipt to a person requiring certification of the document. In this case, however, it is necessary to attach the receipt to the document, and for that purpose it is necessary to store the receipt together with the document, which is troublesome in actual operations.

In the well-known electronic systems for business contracts, it is technologically possible for a person having a malicious intention to disguise as the person having the right to legally acquire the time information. Further, in the case of a time stamp with an electronic signature by a third party, a document to be time-stamped or a digest thereof is sent to an time stamp issuing organization, and the time stamp issuing organization returns the time-stamped document with the time information and their electric signature thereon, so that the operations are complicated and the cost is rather expensive.

Further in the case of the time stamp with an electronic signature by a third party, a time-stamped file and a time stamp certificate (electronic signature) must be stored together, so that its effective utilization is difficult in practice.

In addition, in the case of the time stamp with an electronic signature by a third party, there is a time limit for validity of the electronic signature, so that each time stamp must be updated by the time limit for prolonging the term of validity, which is troublesome in practice.

It is desirable for alleviating the work load that a time stamp can be verified in the offline more, but even if a signature verification key is publicized, there is a time limit in the term of validity for the electronic signature, so that the time stamp must be updated by the time limit for prolonging the term of validity, which is troublesome in practice.

The prevent invention was made to solve the problems as described above, and it is an object of the present invention to provide a time stamping system for electronic documents making it possible to easily time-stamp documents including those prepared with a general purpose document preparation software for certifying preparation dates of the documents and also to easily and accurately verify the dates. It is also an object of the present invention to provide a program medium for the time stamping system for electronic documents as described above.

(Means for Solving the Problems)

A time stamping system for electronic documents according to the present invention is based on the configuration where a digest value generated based on an electronic document prepared by a client electronic document preparation terminal device with electronic document preparation software incorporated therein is transmitted to an external organization device and the external organization device assigns the time of receipt and an electronic signature to the digest value and returns it to the client, in which the client electronic document preparation terminal device comprises an electronic document reading means for reading an electronic document prepared by the electronic document preparation software; a digest value computing means for computing a digest value including a hash value as a unidirectional function value based on a read document; a transmitting means for correlating the digest value to an ID number of the client electronic document preparation terminal device and transmitting the digest value and the ID number to the external organization device; a receiving means for receiving an electronic certificate transmitted thereto from the external organization device with the time of receipt and the electronic signature assigned to the digest value received by the external organization device as well as to the ID number of the client electronic document preparation terminal device; and an electronic certificate inserting and writing means for writing the received electronic certificate in the electronic document to be timestamped stored in the client electronic document preparation terminal device.

A computer-readable program medium for time-stamping electronic documents according to the present invention has a program recorded therein and enabling a computer to realize a function for sending a digest value for an electronic document prepared by a client electronic document preparation terminal device with electronic document preparation software incorporated therein to an external organization device and a function for receiving the electronic certificate returned from the external organization device with the time of receipt and an electronic signature assigned thereby to the digest value, and inserting and writing the electronic certificate in the electronic document to be time-stamped stored in the client electronic document preparation terminal device, in which the client electronic document preparation terminal device has a program recorded therein for enabling a computer to realize an electronic document reading function for reading electronic documents prepared by the electronic document preparation software; a digest value computing function for computing a digest value from the read electronic document alkoxysilane a unidirectional function value thereof; a transmitting function for correlating the digest value to an ID number of the client electronic document preparation terminal device and transmitting the digest value and ID number correlated to each other to the external organization device; a receiving function for receiving the electronic certificate returned from the external organization device with a time stamp and an electronic signature assigned thereto; and an electronic certificate writing function for writing the returned electronic certificate in an electronic document to be time-stamped prepared by the client electronic document preparation terminal device.

As described above, with the time stamping system for electronic documents according to the present invention based on the configuration as described above as well as the program medium for the system, by using add-on application software for preparation of documents, the time stamp processing can be performed to documents treated by the software, and further as a time stamp certificate is buried in the document to be time-stamped, so that there is no need of managing a document to be time-stamped and a time stamp certificate for the document discretely. Further in the present invention, two types of electronic signatures are possible, and a verification key for one type of electronic signature is secret, while that for the other type of electronic signature is public, so that the verification at a high reliability level can be performed also at the user site without losing the high security level.

In the present invention, the software for document preparation is integrated with the time stamping function, so that everyone can easily treat authenticated time data, and a user can select himself or herself an easy verification method or a difficult and strict verification method for verifying a time stamp according to the importance of a document to be verified.

DESCRIPTION OF SIGNS

10: Time stamp processing organization as a center
11: Timer server
12: Time stamp issuing server
13: Time stamp verifying server
20: Electronic document preparation organization
30: First document preparation terminal device
31: Request for a time stamp
32: Response to the request for a time stamp
40: Second document preparation terminal device
50: Communication network
$K_{s1}$: Secret key for generation of a signature
$K_{s2}$: Secret key for generation of a signature
$K_{v1}$: Public key for verification of a signature
$K_{v2}$: Public key for verification of a signature

DETAILED DESCRIPTION OF THE EMBODIMENTS

Figure 1:
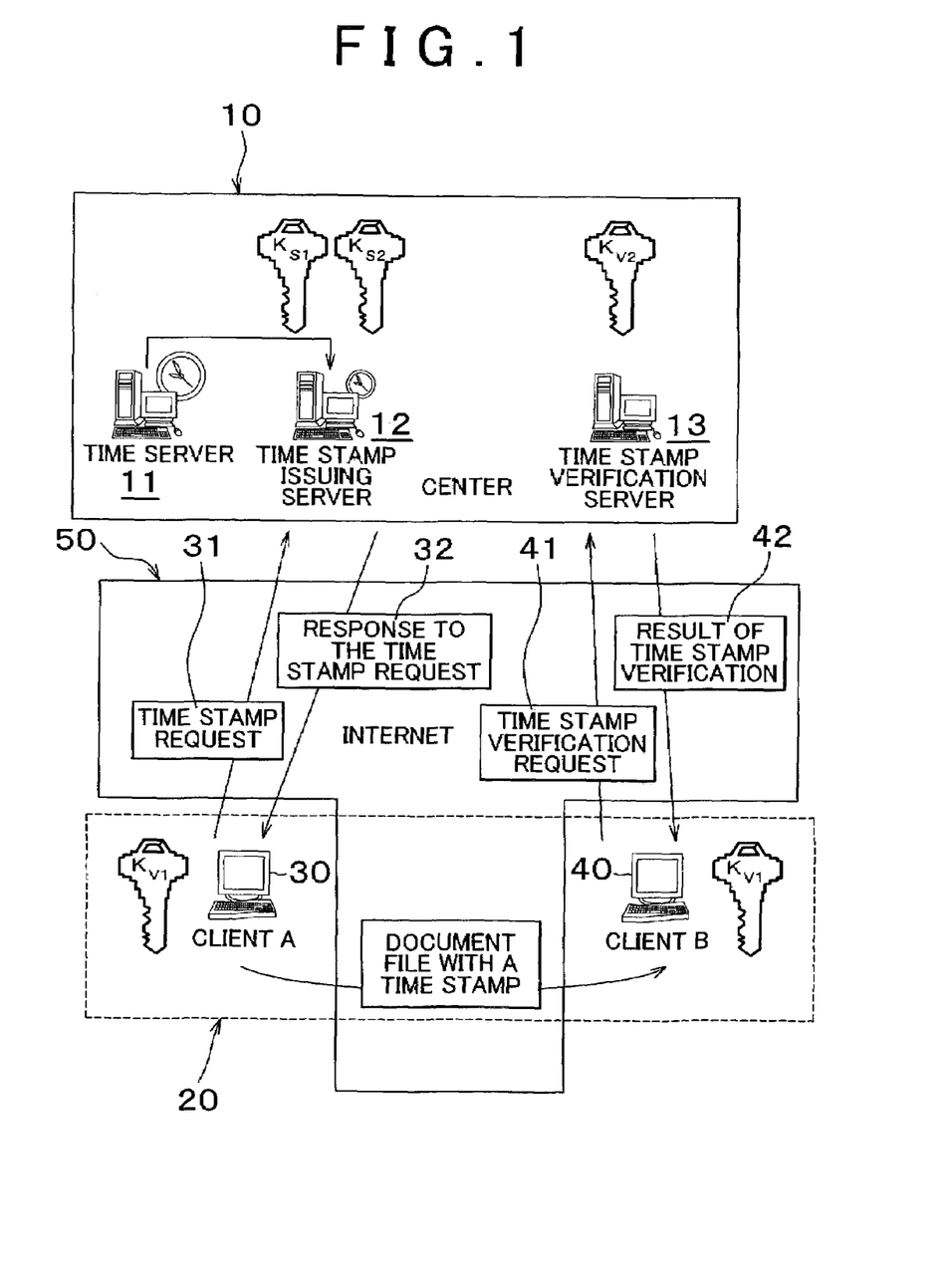
FIG. 1 is a block diagram showing general configuration of a time stamping system for electronic documents according to one embodiment of the present invention.

The time stamping system for electronic documents according to embodiments of the present invention are described below with reference to the attached drawings. FIG. 1 shows general configuration of a time stamping system according to one embodiment of the present invention, and in this figure, designated at the reference numeral is a time stamp processing center as an external organization, and at 20 is an electronic document preparing organization as a client. The time stamp processing center 10 comprises a timer server 11, a time stamp issuing server 12, and a time stamp verification server 13.

The electronic document preparing organization 20 comprises a plurality of electronic document preparation terminal devices, and specifically has a first document preparation terminal device 30 (client A) and a second document preparation terminal device 40 (client B). The time stamp issuing server 12 and time stamp verification server 13 in the time stamp processing center 10 have computers or communication equipment respectively, and also the document preparing organization 20 and second document preparation terminal device 40 have computers or communication equipment respectively. The time stamp processing center 10 and the electronic document preparing organization 20 are connected through a communication network 50 such as the Internet to each other so that communications can be performed therebetween, and also the first terminal device 30 and second terminal device 40 are connected through a communication network 50 to each other so that communications can be performed therebetween.

Further each of the time stamp issuing server 12, time stamp verification server 13, first document preparation terminal device 30, and second document preparation terminal device 40 has a keying function for an electronic signature respectively, and more specifically the time stamp issuing server 12 have signature generation secret keys $K_{s1}$ and $K_{s2}$, the time stamp verification server 13 has a signature verification secret key $K_{v2}$, the first document preparation terminal device 30 has a signature verification public key $K_{v1}$, and the second document preparation terminal device 40 has a signature verification public key $K_{v1}$.

The time server 11 in the time stamp processing center 10 is synchronized to the Coordinate Universal Time, and distributes time data to the time stamp issuing server 12. The first document preparation terminal device 30 transmits a time stamp request message 31 to the time stamp issuing server 12, and the time stamp issuing server 12 returns a time stamp response message 32 to the first document preparation terminal device 30. Similarly, the second document preparation terminal device 40 transmits a time stamp verification request message 41 to the time stamp verification server 13, while the time stamp verification server 13 transmits a time stamp verification result 42 to the second document preparation terminal device 40. Further the first document preparation terminal device 30 transmits a time-stamped document file to the second document preparation terminal device 40.

The time stamp issuing server 12 provides an electronic signature by adding time data to the data to be time-stamped in response to the time stamp issuing request from the time stamp add-on software. The time stamp verification server 13 decodes a signature on the time stamp data in response to the time stamp verification request from the time stamp add-on software. The electronic document preparing organization 20 in the client site has time stamp add-on software which is application software for preparing and editing documents (electronic documents). The electronic document preparing organization 20 fetches time data from the center each time a time stamp processing request is generated, and transmits a digest value (hash value)for a document to be time-stamped to the center each time the time stamp processing is performed, while the center assigns time data and an electronic signature to the digest value and returns the digest value to the organization 20.

The hash value is a value computed through a hash function which is a unidirectional function, and the unidirectional function can easily be operated to convert an input value and output the converted value, but can not or can hardly be applied to computing in the reverse direction. On the other hand, the hash function is, to define it broadly, a function for mapping values to a board area, but the hash function used for encryption or the like is unidirectional in some aspects, and also has the non-colliding coincidence (meaning that the probability of giving the same result to different input values is low).

Components of the client software include time stamp add-on software, document edition add-on software, and an operating system, and these components form a time stamp generating section, a time stamp authenticity verifying section (offline verification), an online authenticity verifying section (for issuing inquiries to the center), and a time stamp authenticity verifying section. The time stamp generating section has a function for computing a hash value for a document, a function for performing communications concerning time stamps with the center, and a function for generating a random password and converting a document to Read-Only one using the password for storage of the document.

The time stamp authenticity verifying section (offline verification) has a function to display data in a buried TS-object. The time stamp authenticity verifying section (for issuing inquiries to the center) has a function to compute a hash value for a document with a time stamp buried therein, a function to send and receive time stamp information verification requests and the results to and from the center, and a function to display a result of the verification.

Figure 9:
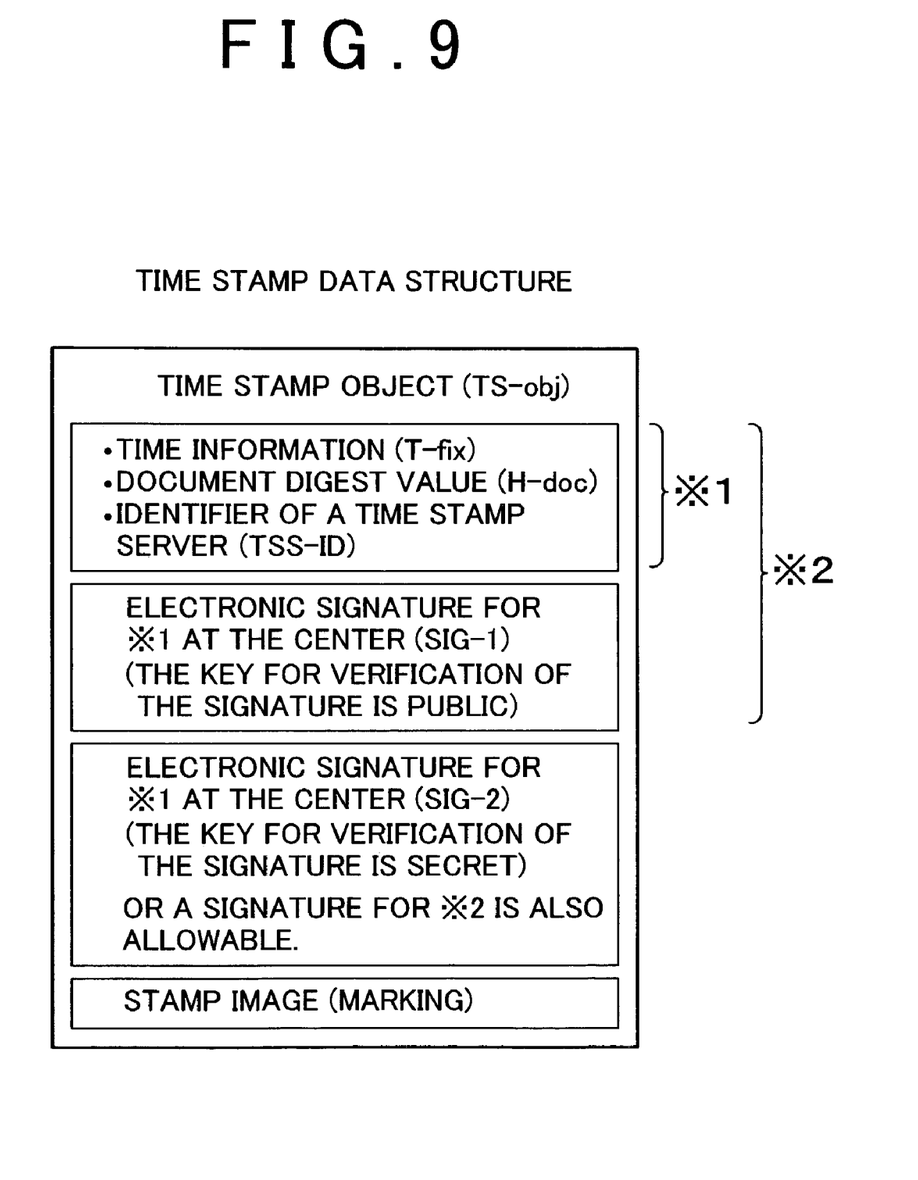
FIG. 9 is an explanatory view showing the time stamp data structure used in the time stamping system for electronic documents according to an embodiment of the present invention.

As shown in FIG. 9, the time stamp data generally comprises original time stamp information comprising time information (T-fix), a document digest value (H-doc), and a time stamp server identifier (TSS-ID) each as a TS-object (TS-obj); public key-signed information comprising an electronic signature (SIG-1) for the original time stamp information(the signature verification key is public), namely information (SIG-1) prepared by converting the original time stamp information (T-fix, H-doc, TSS-ID) to hash values and encoding the hash values with the signature verification public key (KV$_2$) and decodable to the hash values for the original time stamp information by decoding the encoded hash values, and secret key-signed information comprising an electronic signature (SIG-2) assigned to the original time stamp information at the center (the signature verification key is not public), and an stamp image (marking).

Figure 10:
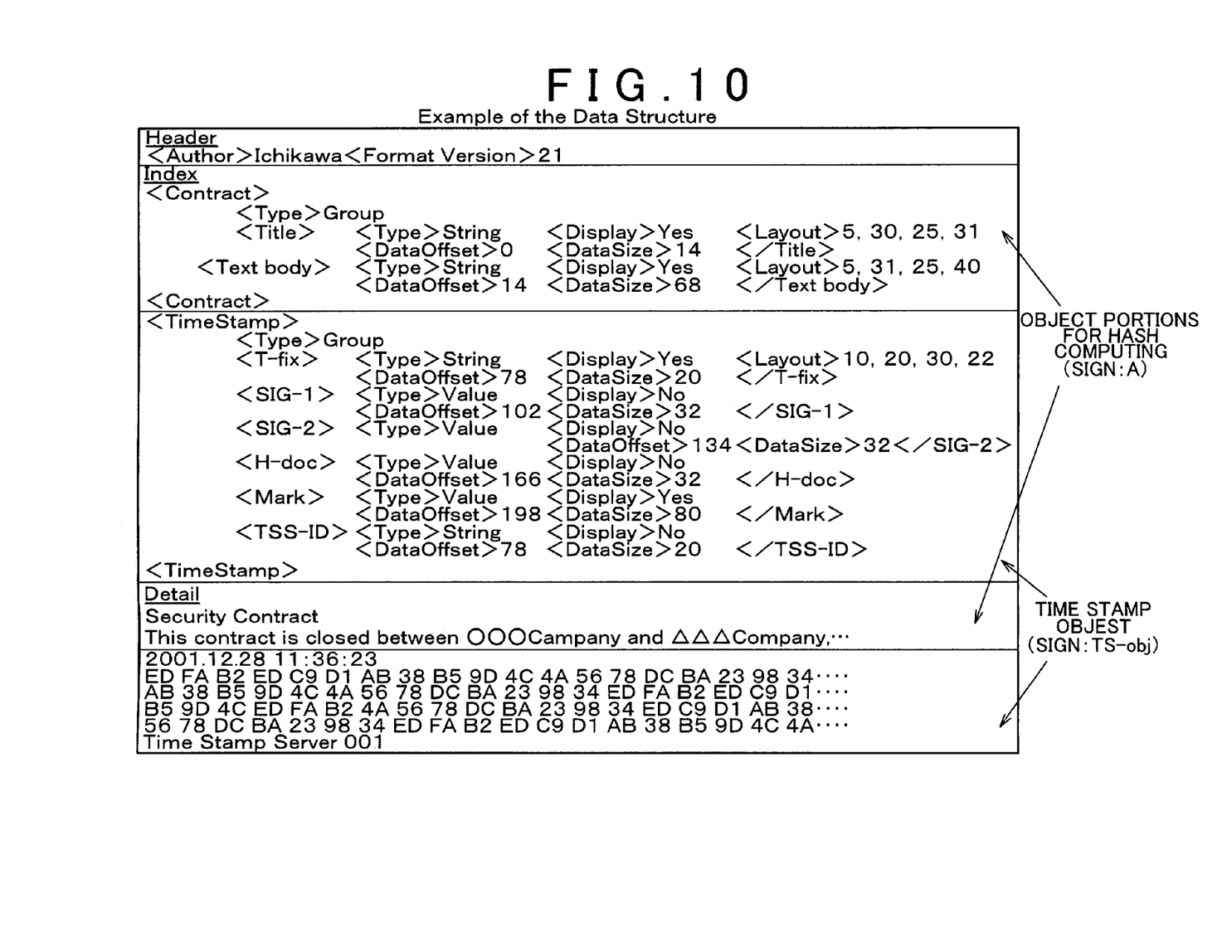
FIG. 10 is an explanatory view showing the document data structure.

FIG. 10 shows an example of document data, and the document data is divided to a header block, an index block, and a detail block, and the header is information relating to the document as a whole such as an author's name, and a version of the grammar used for describing the document. The index is tag information for each object in a document, and comprises such information as a specific identifier for each object, an attribute which indicates whether the data is to be displayed or not, a position for display, and information concerning the location where the data to be displayed is present. The detail section stores therein data for each object defined in the index.

The index block comprises <Display>, <Layout>, <Dataoffset>, and <DataSize>. The <Type> defines an object type, and comprises Group (a group not having substantial data), String (character string data), Value (numerical value), and Graphic (Image data). Display is a control flag indicating whether the data is to be displayed or not, Layout is information for a display position (a coordinate range), DataOffset is an offset for the Detail block, and DataSize indicates a data size of object data in the detail block. A portion of the document data block as an object for which a digest value is to be calculated and also which is to be treated as an object for an electronic signature for time stamping is the section "A" excluding the object for time stamping. The sections corresponding to the index and detail blocks are the "sign A" as an object for hash computing, while the object for time stamping is the sign TS-obj. Namely the time stamp is incorporated in the document.

Figure 2:
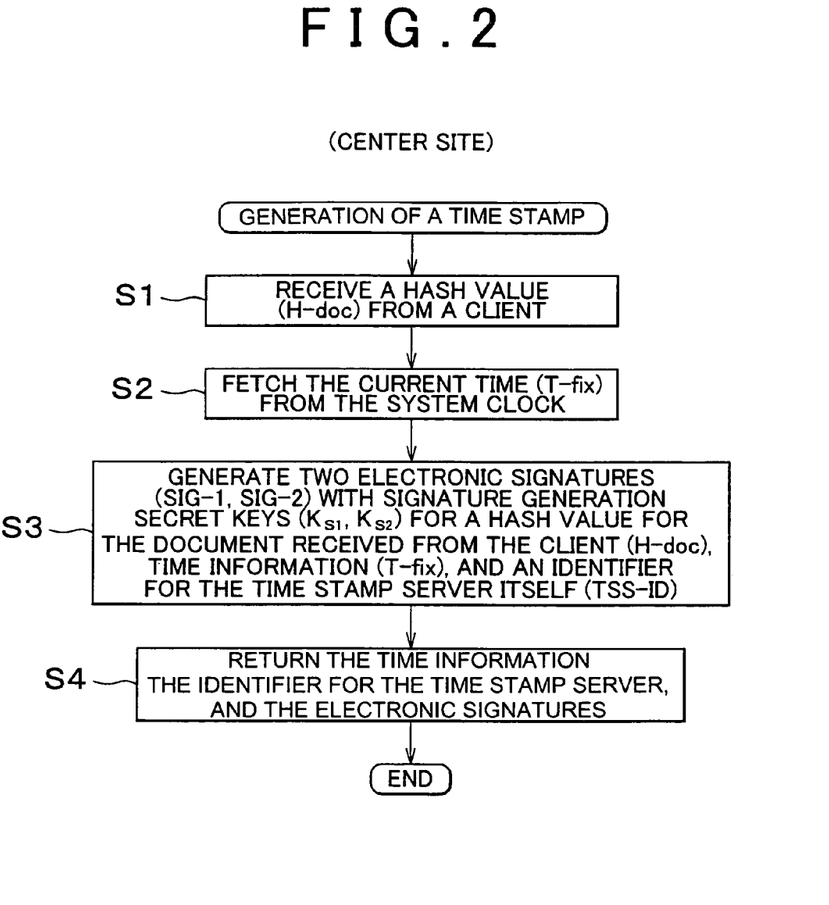
FIG. 2 is a data flow diagram showing a data flow at a center when a time stamp is generated in the time stamping system for electronic documents according to an embodiment of the present invention.

FIG. 2 shows a data flow for generation of a time stamp in the time stamp processing center 10 which is an external organization, and as shown in FIG. 2, in step S1, the time stamp issuing server 12 receives a hash value (Hdoc) from the first document preparation terminal device 30 in the electronic document preparing organization 20 as a client site. In step S2, the time stamp issuing server 12 fetches the current time (T-fix) from the system clock. Then in step S3, the time stamp issuing server 12 generates two electronic signatures (SIG1, SIG2) for the hash value (H-doc) and time information (T-fix) for the document received from the client and an identifier (TSS-ID) of the time stamp server itself using the signature generation secret keys K$_{s1}$, K$_{s2}$, and then in step S4, the time information, the identifier for the time stamp issuing server 12 and the electronic signatures are returned to the first document preparation terminal device 30 at the client site.

Figure 3:
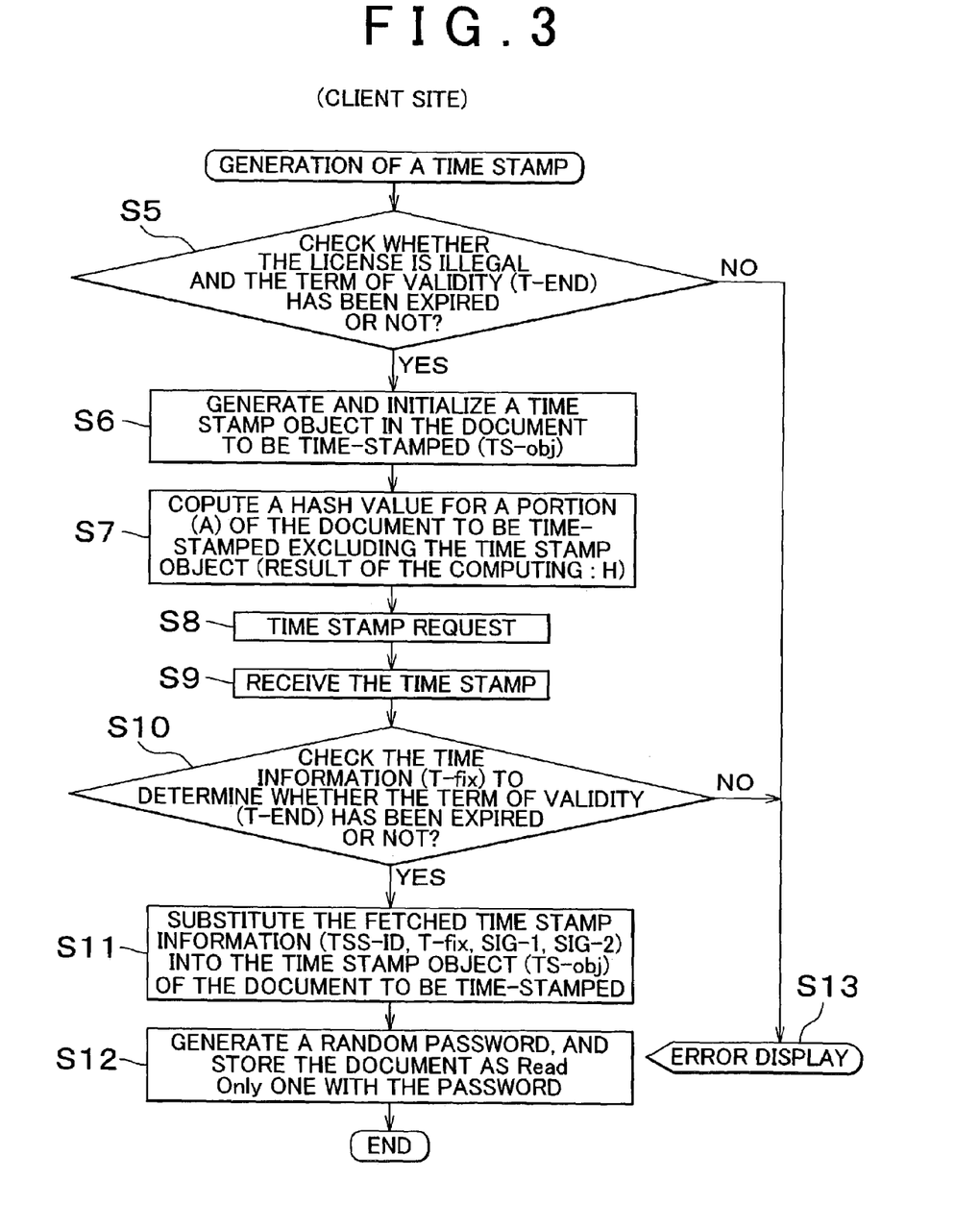
FIG. 3 is a data flow diagram showing a data flow at a client site when a time stamp is generated in the time stamping system for electronic documents according to an embodiment of the present invention.

FIG. 3 shows a data flow for generation of a time stamp in the first document preparation terminal device 30 as a client site, and in step S5, determination is made as to whether the license is correct or not, and also as to whether the term of validity (T-BND) is within the specified term based on the system time or not. If it is determined that the term of validity has not been expired, the system processing goes to step S6 where an TS-object is generated for the document to be time-stamped and the object is initialized (TS-obj), and in step S7, a hash value is computed for the portion "A" which is equivalent to a portion of the document to be time-stamped excluding the TS-object therefrom (a result of computing is H). Then in step S8, a request for time stamping is sent to the time stamp issuing server 12 at the center, and in step S9, the time stamp is received from the time stamp issuing server 12 to obtain a time stamp server identifier (TSS-ID), time information (T-fix), and electronic signatures (SIG-1, SIG-2).

Then in step S10, the received time information (T-fix) is checked against the term of validity (T-END) to determine whether the term or validity has been expired or not. If it is determined that the term of validity has not been expired, in step S11, the fetched time stamp information (TSS-ID, T-fix, SIG-1, SIG-2) is substituted into the TS-object (TS-obj) for the document to be time-stamped, and then in step S12, the document is stored as Read Only data with a random password. If it is determined in steps S5 and S10 that the term of validity has been expired, the error is displayed in step S13. It is to be noted that, when a time stamp generation screen is operated in a computer at the client site, the public key signature information can be obtained by initializing the time stamp area by operating the mouse.

Figure 4:
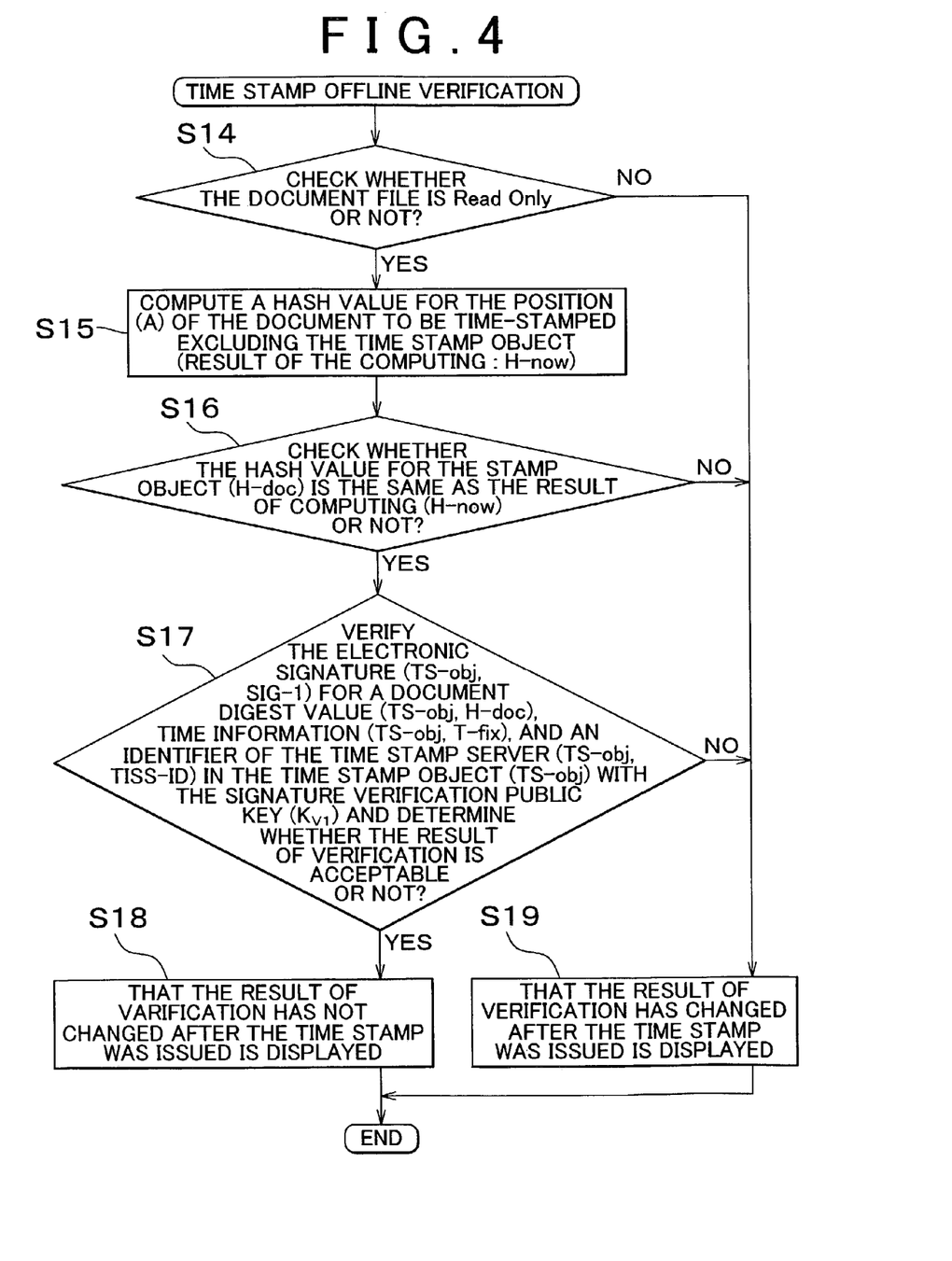
FIG. 4 is a data flow diagram showing a data flow during the time stamp offline verification in the time stamping system for electronic documents according to an embodiment of the present invention.

FIG. 4 shows a data flow in time stamp offline verification, and as shown in FIG. 4, whether the document file is Read Only or not is determined in step S14. When it is determined that the file is Read Only, a hash value is computed for the portion "A" of the document to be time-stamped excluding the TS-object therefrom, and a result of the computing is (H-now). Then in step S16, the second document preparation terminal device 40 at the client site determines whether the hash value (H-doc) for the document to be time-stamped is the same as a result of the computing (H-now) or not. When it is determined that the hash value is the same as (H-now), the public key-signed information encoded by the operation of the signature verification public key ($K_{v1}$) for the second document preparation terminal device 40 is decoded, and based on this decoded public key-signed information, comparison and verification to the original time stamp information (T-fix, H-doc, and TSS-ID) (more specifically, comparison and verification of the decoded value for the electronic signature (SIG-1) to the hash value for the original time stamp) is performed, and when it is determined that the hash value for the original time stamp information is the same as the decoded value for the electronic signature, it is displayed in step S18 that a result of the verification has not been changed after the time stamp was issued.

When it is determined that the document file is not Read Only in the step 14, and when it is determined in step S16 that the (H-doc) is not the same as (H-now), or when it is determined in step S17 that the hash value for the original time stamp information is not the same as the decoded value for the electronic signature (SIG-1), the system control shifts to step S19, and the second document preparation terminal device 40 displays that the result of verification has changed after the time stamp was issued. In a case where the time stamp verification screen is operated on a computer terminal device at the client site, when the public key is operated, and more specifically when the time stamp area is operated and started by operating the mouse, the public key-signed information can be disclosed and obtained.

Figure 5:
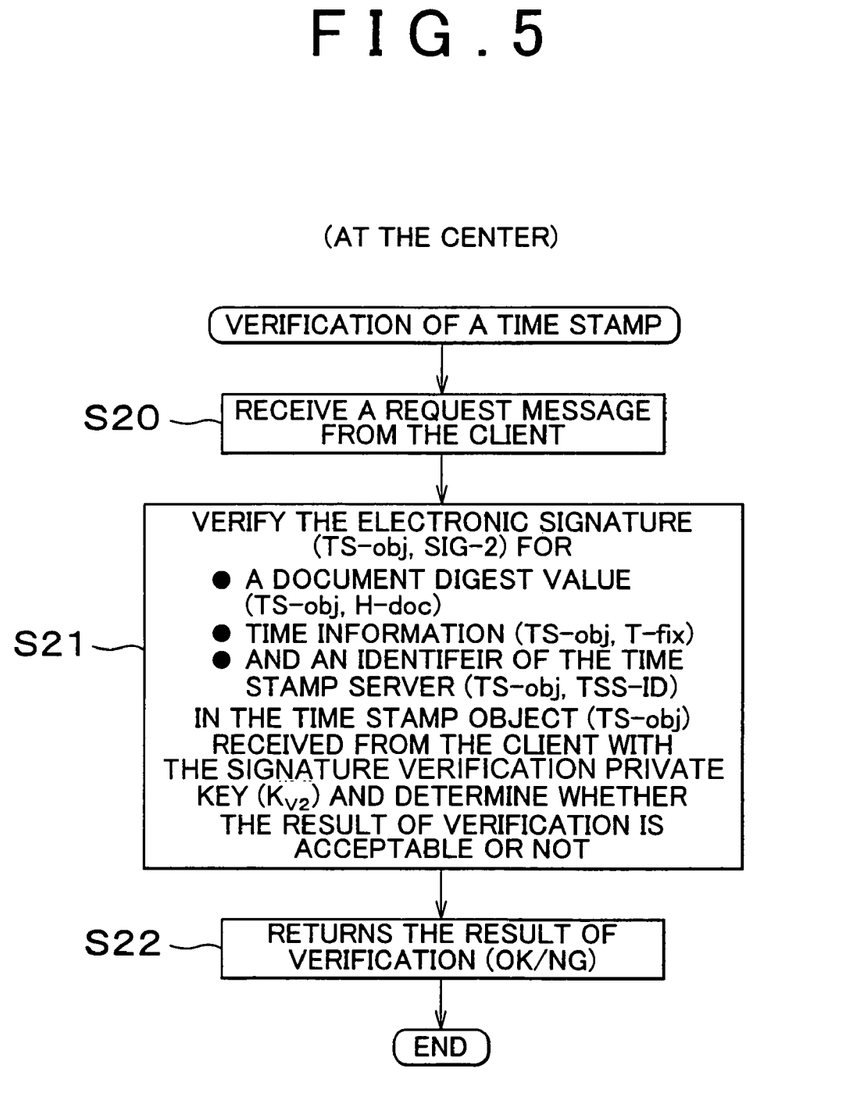
FIG. 5 is a data flow diagram showing a data flow at the center during the time stamp online verification in the time stamping system for electronic documents according to an embodiment of the present invention.
Figure 6:
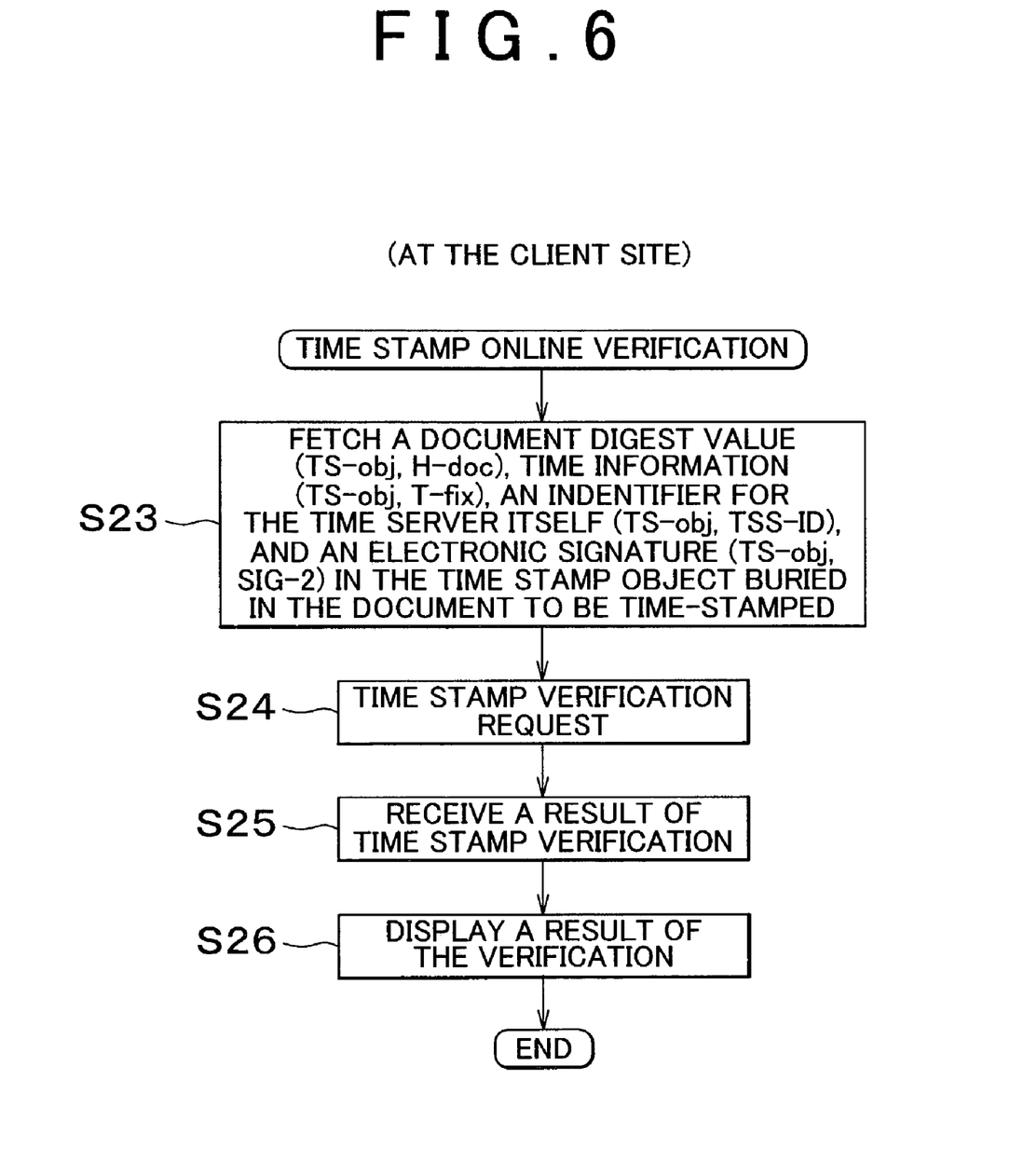
FIG. 6 is a data flow diagram showing a data flow at the client site during the time stamp online verification in the time stamping system for electronic documents according to an embodiment of the present invention.

FIG. 5 and FIG. 6 show a data flow in time stamp online verification when all of the operations for verifying a signature are performed at the center, and FIG. 5 shows the verification processing performed by the time stamp verifications server 13 at the center side. At first, in step S20, for verifying the time stamp at the center, the time stamp verification server 13 at the center receives a request massage including a digest value for a document to be time-stamped (TS-obj, H-doc), time information (TS-obj, T-fix), and electronic signatures (TS-obj, SIG-2) from the second document preparation terminal device 40 at the client site. Then in step S21, the secret key-signed information in the electronic certificate encoded by operating the signature verification secret key ($K_{v2}$) in the second document preparation terminal device 40 at the client site is decoded, and based on the decoded secret key-signed information, comparison and verification to the original time stamp information (T-fix, H-doc, TSS-ID) (more specifically comparison and verification of the hash value for the original time stamp information to the decoded value for the electronic signature (SIG-2)) is performed. Then in step S22, a result of the verification (OK/NG) is returned to the second document preparation terminal device 40 at the client site. As described above, an electronic signature is generated and verified at the center, so that the key for verification of the signature is not publicized.

FIG. 6 shows a data flow in verification by the second document preparation terminal device 40 at the client site. At first, a document digest value (TS-obj, H-doc) buried in a document to be time-stamped, time information (TS-obj, H-doc), time information (TS-obj, T-fix), an identifier for the time server itself (TS-obj, TSS-ID), and an electronic signature (TS-obj, SIG-2) are fetched. In this step, offline verification may automatically be performed before online verification. In step S24, a request for verification of the time stamps for the document digest value (TS-obj, H-doc), time information (TS-obj, T-fix), and the electronic signatures (TS-obj, SIG-2) is sent to the time stamp verification server 13 at the center. Then in step S25, a result of the time stamp verification is received from the time stamp verification server 13 at the center, and instep S26, a result of the verification is displayed.

Figure 7:
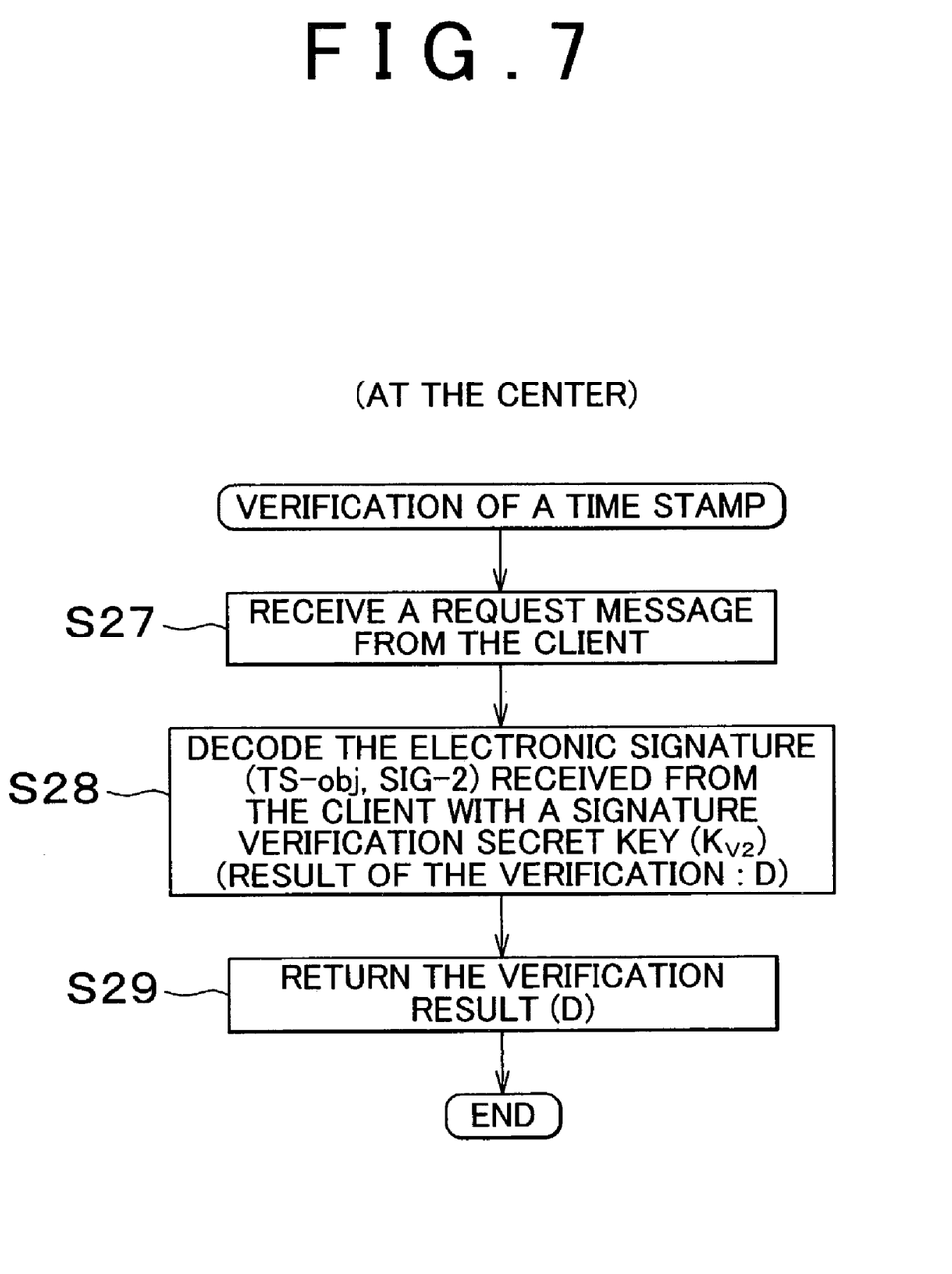
FIG. 7 is a data flow diagram showing a data flow at the center during the time stamp online verification in the time stamping system for electronic documents according to an embodiment of the present invention.
Figure 8:
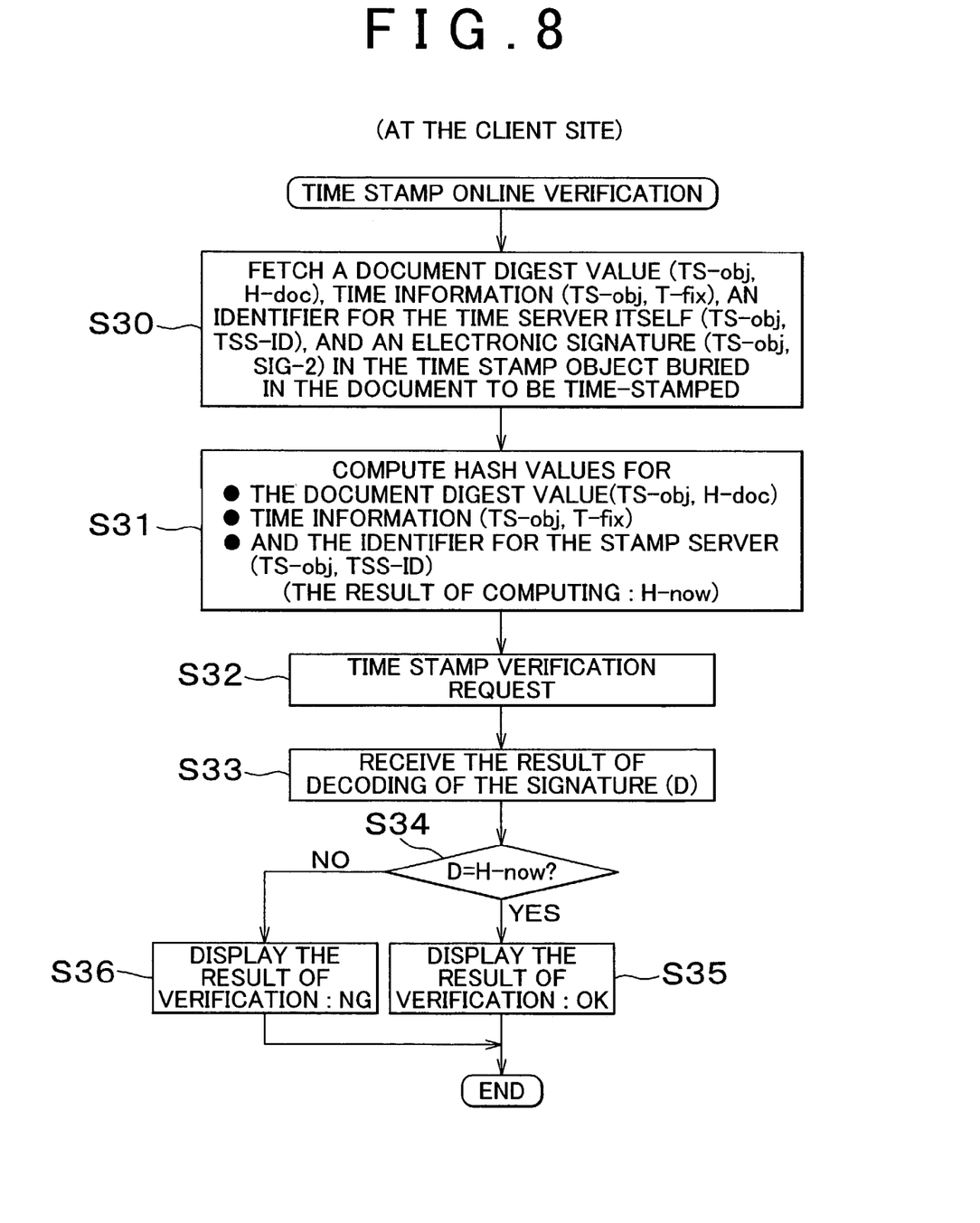
FIG. 8 is a data flow diagram showing a data flow at the client site during the time stamp online verification in the time stamping system for electronic documents according to an embodiment of the present invention.

FIG. 7 and FIG. 8 show a data flow in time stamp online verification in a case where only the decoding is performed at the center, and as shown in FIG. 7, for verifying the time stamp at the center, the time stamp verification server 13 receives in step S27 a time stamp verification request message for the electronic signature (TS-obj, SIG-2) from the second document preparation terminal device 40 at the client site. Then in step S28, the electronic signature (TS-obj, SIG-2) received from the client is decoded with the signature verification secret key $K_{v2}$, and the result of verification is indicated by the sign D. Then the result of decoding D is returned to the client in step S29.

FIG. 8 shows data processing performed by the second document preparation terminal device 40 at the client site, and to perform online verification for a time stamp at the client site, as shown in FIG. 8, in step S30, the second document preparation terminal device 40 fetches a digest value buried in a document to be time-stamped (TS-obj, H-doc), time information (TS-obj, T-fix), an identifier for the time server identifier (TS-obj, TSS-ID), and an electronic signature (TS-obj, SIG-2). In step S31, hash values for the document digest value (TS-obj, H-doc), time information (TS-obj, T-fix), and the identifier for the time stamp server (TS-obj, TSS-ID) are computed, and a result of the computing is displayed as H-now. In step S32, the second document preparation terminal device 40 requests verification of the time stamp for the electronic signature (TS-obj, SIG-2) for the time stamp verification server 13 at the center, and receives in step S33 a result of decoding D from the center. Then in step S34, whether D is the same as H-now or not is determined, namely the time information, digest value, and ID are checked, and if it is determined that D is the same as H-now, it is displayed in step S34 that the result of verification is acceptable. If it is determined that D is not the same as H-now, it is displayed in step S36 that the result of verification is not acceptable.

As the time stamping system for electronic documents according to the embodiments of the invention as described above has a time stamping function installed therein as add-on software for application software for preparation of documents, so that the time stamping is automatically performed by the add-on software when a document to be time-stamped is opened. Further, as the time stamp is incorporated in the document, there is no need for managing the object file and the time stamp certificate discretely. Further multiplex security against illegal modification of a time stamp and a document to be time-stamped is provided and a plurality of verification steps are prepared, so that a user can select an optical method for verification of documents according to the importance of each document. Further generation and verification of an electronic signature are performed at the center and the key for verification of a signature is not public, so that the term of validity for an electronic signature (term of validity of a time stamp) can be extended.

(Advantages of the Invention)

As described above, the following advantages are provided by the time stamping system for electronic documents and a program medium for the same according to the present invention.

(1) With the add-on software incorporating a time stamping function for such functions as reading documents, conversion to hash values, transmission to an external organization device, receiving certificates from the external organization device, and burying a certificate in an electronic document, it is possible to assign time stamp information to an electronic document prepared by general purpose document preparation software installed in a terminal device at a client site, and therefore time information for certification can easily and automatically be stamped on each document during preparation of the document.

(2) The electronic certificate written in an electronic document includes information for certifying the time information, and when the document is sent to other terminal(s), the certificate is automatically sent together with the document, so that there occurs no mistake in certificate management, and this feature is convenient for offline verification of time.

(3) Offline verification and online verification can be performed based on the same electronic certificate, so that it is possible to select the best method of verification according to the importance of each document or the necessity, which in turn makes it possible to reduce workload and cost for verification to an appropriate level.

(4) By installing the program medium according to the present invention in a terminal device at a client site, it is possible to add high reliability information to an electronic information prepared with general purpose software, which provides extremely practical advantages.

What is claimed is:

1. A time stamp verification method comprising:
   hashing, at a client terminal, a portion of a document that is to be protected by a time stamp so as to create a first hash value;
   communicating the first hash value to a time stamp server;
   encrypting, at the time stamp server, the received first hash value, a time value, and the time stamp server's identification using two different keys to generate first and second signatures;
   communicating the first and second signatures, the time value, and the time stamp server's identification to the client terminal;
   combining the received first and second signatures, time value, and time stamp server's identification with the first hash value generated by the client terminal to create a time stamp and storing the time stamp with the document; and
   verifying the time stamp stored with the document by:
      hashing the portion of the document that is protected by the time stamp to create a second hash value,
      comparing the second hash value to the first hash value stored within the time stamp to produce a first comparison result;
      decrypting the first signature within the time stamp to regenerate the first hash value, time value, and time stamp server's identification,
      comparing the regenerated first hash value, time value, and time stamp server's identification to the first hash value, time value, and time stamp server's identification stored within the time stamp to generate a second comparison result, and
      producing an indication that the time stamp for the document is authentic if the first and second comparison results both indicate matches.

2. The method of claim 1 further comprising:
   communicating the document and time stamp to a requesting terminal; and
   verifying, with the requesting terminal, the document time stamp by:
      communicating the second signature, first hash value, time value, and time stamp server's identification stored within the time stamp from the requesting terminal to a verification server,
      decrypting, with the verification server, the received second signature to regenerate the first hash value, time value, and time stamp server's identification within the second signature,
      comparing, at the verification server, the regenerated first hash value, time value, and time stamp server's identification to the received first hash value, time value, and time stamp server's identification stored within the time stamp to generate a third comparison result,
      communicating the third comparison result to the requesting terminal, and
      producing, at the requesting terminal, an indication that the time stamp for the document is authentic if the received third comparison result indicates a match.

3. The method of claim 1 further comprising:
   communicating the document and time stamp to a requesting terminal; and
   verifying, with the requesting terminal, the document time stamp by:
      hashing, at the requesting terminal, the portion of the document protected by the time stamp so as to create a third hash value;
      communicating the second signature stored within the time stamp from the requesting terminal to a verification server,
      decrypting, with the verification server, the received second signature to regenerate the first hash value within the second signature,
      communicating the regenerated first hash value to the requesting terminal,
      comparing, at the requesting terminal, the received regenerated first hash value with the third hash value to produce a third comparison result,
      producing, at the requesting terminal, an indication that the time stamp for the document is authentic if the third comparison result indicates a match.

4. A time stamp verification method comprising:
   hashing, at a client terminal, a portion of a document that is to be protected by a time stamp so as to create a first hash value;
   communicating the first hash value to a time stamp server;
   encrypting, at the time stamp server, the received first hash value, a time value, and the time stamp server's identification using two different keys to generate first and second signatures;
   communicating the first and second signatures, the time value, and the time stamp server's identification to the client terminal;

combining the received first and second signatures, time value, and time stamp server's identification with the first hash value generated by the client terminal to create a time stamp and storing the time stamp with the document; and verifying, by a requesting terminal having access to the document and time stamp, the time stamp stored with the document by:

communicating the second signature, first hash value, time value, and time stamp server's identification stored within the time stamp from the requesting terminal to a verification server, decrypting, with the verification server, the received second signature to regenerate the first hash value, time value, and time stamp server's identification within the second signature, comparing, at the verification server, the regenerated first hash value, time value, and time stamp server's identification to the received first hash value, time value, and time stamp server's identification stored within the time stamp to generate a first comparison result, communicating the first comparison result to the requesting terminal, and producing, at the requesting terminal, an indication that the time stamp for the document is authentic if the received first comparison result indicates a match.

5. The method of claim 4 further comprising, at the requesting terminal:

hashing the portion of the received document that is protected by the time stamp to create a second hash value, comparing the second hash value to the first hash value stored within the time stamp to produce a second comparison result;

decrypting the first signature within the time stamp to regenerate the first hash value, time value, and time stamp server's identification, comparing the regenerated first hash value, time value, and time stamp server's identification to the first hash value, time value, and time stamp server's identification stored within the time stamp to generate a third comparison result, and producing an indication that the time stamp for the document is authentic if the second and third comparison results both indicate matches.

6. A time stamp verification method comprising:

hashing, at a client terminal, a portion of a document that is to be protected by a time stamp so as to create a first hash value;

communicating the first hash value to a time stamp server;

encrypting, at the time stamp server, the received first hash value, a time value, and the time stamp server's identification using two different keys to generate first and second signatures;

communicating the first and second signatures, the time value, and the time stamp server's identification to the client terminal;

combining the received first and second signatures, time value, and time stamp server's identification with the first hash value generated by the client terminal to create a time stamp and storing the time stamp with the document; and verifying, by a requesting terminal having access to the stored document and time stamp, the time stamp stored with the document by:

hashing, at the requesting terminal, the portion of the document protected by the time stamp so as to create a second hash value;

communicating the second signature stored within the time stamp from the requesting terminal to a verification server, decrypting, with the verification server, the received second signature to regenerate the first hash value within the second signature, communicating the regenerated first hash value to the requesting terminal, comparing, at the requesting terminal, the received regenerated first hash value with the second hash value to produce a first comparison result, and producing, at the requesting terminal, an indication that the time stamp for the document is authentic if the first comparison indicates a match.

7. The method of claim 6 further comprising, at the requesting terminal:

hashing the portion of the document that is protected by the time stamp to create a third hash value, comparing the third hash value to the first hash value stored within the time stamp to produce a second comparison result;

decrypting the first signature within the time stamp to regenerate the first hash value, time value, and time stamp server's identification, comparing the regenerated first hash value, time value, and time stamp server's identification to the first hash value, time value, and time stamp server's identification stored within the time stamp to generate a third comparison result, and producing another indication that the time stamp for the document is authentic if the second and third comparison results both indicate matches.

* * * * *